under 35
U.S.C. 154(b) by 0 days.

(12) United States Patent
Rosales et al.

(10) Patent No.: US 10,189,660 B1
(45) Date of Patent: Jan. 29, 2019

(54) AUXILIARY MEDIA UNIT TRANSPORTER FOR MEDIA PROCESSING DEVICES

(71) Applicant: ZIH Corp., Lincolnshire, IL (US)

(72) Inventors: Angel B. Rosales, Port Hueneme, CA (US); Steve Ting Kei Chow, Monterey Park, CA (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 15/643,966

(22) Filed: Jul. 7, 2017

(51) Int. Cl.
*B65H 5/06* (2006.01)
*B41J 11/04* (2006.01)

(52) U.S. Cl.
CPC .............. *B65H 5/062* (2013.01); *B41J 11/04* (2013.01); *B65H 2403/532* (2013.01); *B65H 2403/723* (2013.01); *B65H 2403/946* (2013.01); *B65H 2513/30* (2013.01); *B65H 2701/1914* (2013.01)

(58) Field of Classification Search
CPC ........ B65H 5/062; B65H 5/066; B65H 5/068; B65H 2513/30; B65H 2403/946; B65H 2403/532; B65H 2403/723; B65H 2403/733
See application file for complete search history.

(56) References Cited

U.S. PATENT DOCUMENTS 1,515,986 A    11/1924  Wright et al.
3,636,316 A *   1/1972  Suzuki ................. B65H 29/125
                                                   101/232
4,281,244 A     7/1981  Murata et al.
4,971,310 A    11/1990  Motegi et al.
5,061,022 A    10/1991  Meriwether
5,768,143 A     6/1998  Fujimoto
6,600,167 B2    7/2003  Sano
D527,044 S      8/2006  Harden et al.
7,328,897 B2    2/2008  Bryant et al.
(Continued)

FOREIGN PATENT DOCUMENTS

EP           385417 A2      9/1990
EP          623894 A1      11/1994
(Continued)

OTHER PUBLICATIONS

Zebra P630i/P640i Card Printer User's Manual, Manual, 2006, pp. 8, 26-28, 980541-003 Rev. A, ZIH Corp.
(Continued)

*Primary Examiner* — Patrick Cicchino

(57) ABSTRACT

A media processing device with a housing includes: a motorized media unit transporter to drive a media unit along a media processing path between an unprocessed media unit source and a processed media unit output; an auxiliary media unit transporter including a roller connected to a converter, and a bias member connected between the converter and the housing. In a first operating mode, the auxiliary transporter receives the media unit from the transporter to drive the roller and the converter; rotation of the converter deforms the bias member from a resting position to a primed position. In a second operating mode initiated upon rotation of the converter to a bias release position, the auxiliary transporter propels the media unit by releasing the bias member from the primed position to drive rotation of the converter and the roller as the bias member returns to the resting position.

18 Claims, 7 Drawing Sheets

(56) References Cited

U.S. PATENT DOCUMENTS

| | | | |
|---|---|---|---|
| 7,416,179 B2 | 8/2008 | Jones et al. | |
| 7,433,614 B2 | 10/2008 | Suzuki | |
| 8,387,975 B2* | 3/2013 | Suzuki | B65H 7/02 |
| | | | 271/176 |
| 2003/0090052 A1* | 5/2003 | Hsiao | B65H 3/0661 |
| | | | 271/114 |
| 2004/0109715 A1 | 6/2004 | Meier et al. | |
| 2005/0078973 A1 | 4/2005 | Suzuki | |
| 2005/0242488 A1 | 11/2005 | Pelletier et al. | |
| 2006/0091331 A1 | 5/2006 | Tanamachi | |
| 2007/0228647 A1* | 10/2007 | Hara | B65H 5/062 |
| | | | 271/272 |
| 2010/0289845 A1 | 11/2010 | Conway et al. | |
| 2011/0049788 A1 | 3/2011 | Suzuki et al. | |
| 2011/0056415 A1 | 3/2011 | Moog et al. | |
| 2011/0123307 A1 | 5/2011 | Pillard | |
| 2011/0217109 A1 | 9/2011 | Cronin et al. | |
| 2012/0181741 A1* | 7/2012 | Suzuki | B65H 5/062 |
| | | | 271/110 |
| 2012/0181744 A1* | 7/2012 | Suzuki | B65H 5/062 |
| | | | 271/243 |
| 2013/0140759 A1* | 6/2013 | Kuo | B65H 3/0684 |
| | | | 271/10.12 |
| 2013/0334771 A1 | 12/2013 | Igarashi | |
| 2014/0374986 A1 | 12/2014 | Takada | |
| 2015/0028532 A1* | 1/2015 | Takahashi | B65H 7/00 |
| | | | 271/3.15 |
| 2016/0229207 A1 | 8/2016 | Perry et al. | |

FOREIGN PATENT DOCUMENTS

| | | |
|---|---|---|
| EP | 1510484 A1 | 3/2005 |
| JP | 200584439 A | 3/2005 |
| WO | 2009/136129 A1 | 11/2009 |

OTHER PUBLICATIONS

Zebra P330i/330M Card Printer User's Manual, Manual, 2004/2005, pp. 26 and 27, 980459-001 Rev. C, ZIH Corp.
Printing and Encoding Solutions, Fargo HDP8500 Industrial Card Printer/Encoder, Brochure, 2014, p. 3, Fargo.
Polaroid XPS Card Printer, Installation and User Guide, Jun. 2011, entire document, Part No. 539957-020 Rev. A.
Evolis Tattoo 2: User's Guide, Sep. 2007, entire document, Evolis Card Printer.
International Search Report and Written Opinion for International Patent Application No. PCT/US2016/017996 dated Jun. 1, 2016.
Evolis Primacy User Guide, Manual, Sep. 2016, entire document, Ref# KU-PRM1-C37-ENC Rev. C6, Evolis.
NBS Technologies Card Printer, Javelin DNA User Guide Manual, Manual, 2015, entire document.
U.S. Appl. No. 14/670,961, filed Mar. 27, 2015, US2016/0280486.
U.S. Appl. No. 15/644,017, filed Jul. 7, 2017.
U.S. Appl. No. 15/951,817, filed Apr. 12, 2018.
U.S. Appl. No. 15/644,048, filed Jul. 7, 2017.
U.S. Appl. No. 15/643,925, filed Jul. 7, 2017.
U.S. Appl. No. 29/606,497, filed Jun. 5, 2017.
U.S. Appl. No. 29/609,961, filed Jul. 7, 2017.
U.S. Appl. No. 15/807,043, filed Nov. 8, 2017.

* cited by examiner

AUXILIARY MEDIA UNIT TRANSPORTER FOR MEDIA PROCESSING DEVICES

BACKGROUND

Media processing devices configured to process discrete media units, such as card printers configured to print identity cards, typically contain a number of components to move media units to various positions within the devices for processing of the media units. Such components may increase the cost and complexity of the media processing devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
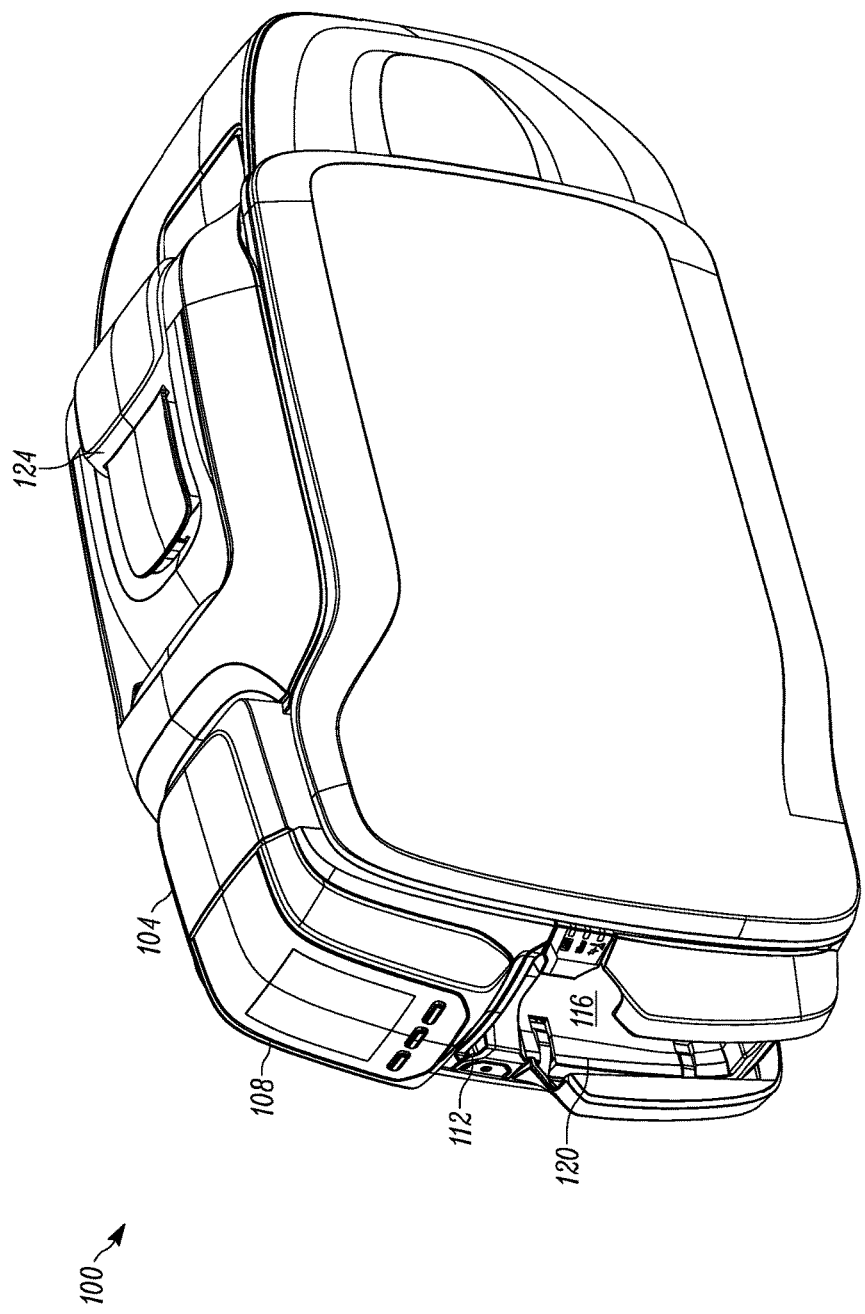
FIG. 1 depicts an example media processing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding embodiments of the apparatus and methods disclosed herein so as not to obscure the disclosure with details that will be readily apparent to those of ordinary skill in the art having the benefit of the description herein.

DETAILED DESCRIPTION

Some media processing devices are configured to process discrete media units, such as identity cards (e.g., driver's licenses or employee badges). Some examples disclosed herein are described using the term "cards." However, cards are example discrete media units and example methods and apparatus disclosed herein are applicable to any suitable type of discrete media unit(s).

Media processing devices configured to process discrete media units, such as identity cards, typically include various internal mechanisms, including rollers, guide surfaces and the like, for transporting and positioning the media units within the processing devices. Such mechanisms are typically driven by motors and associated drive components such as gears and belt-driven pulleys. Such devices may also include auxiliary positions to which a subset of the media units are directed. One example of an auxiliary position is a reject storage area within the media processing device, to which defective media units are directed for collection and disposal. Such auxiliary positions may require additional motors, gears and the like, increasing the complexity and cost of the media processing device, and introducing additional source of potential mechanical failure.

Example methods and apparatus disclosed herein reduce or eliminate components required to transport a media unit along a path. In doing so, example methods and apparatus disclosed herein reduce complexity and cost involved in transporting media units along a path. As described in detail herein, example methods and apparatus disclosed herein drive media units along, for example, an auxiliary path without an additional (i.e., auxiliary) motor. Examples disclosed herein store energy (e.g., using a spring) and then utilize the stored energy to propel the media units along an auxiliary path without the use of an additional motor.

Some examples disclosed herein are directed to a media processing device having a housing, the media processing device comprising: a motorized media unit transporter configured to drive a media unit along a media processing path defined within the housing between an unprocessed media unit source and a processed media unit output; an auxiliary media unit transporter including a roller, a converter connected to the roller, and a bias member connected between the converter and the housing; the auxiliary media unit transporter configured to: (i) in a first operating mode, receive the media unit from the media unit transporter into engagement with the roller, to drive the roller and the converter; and via rotation of the converter, deform the bias member from a resting position to a primed position; and (ii) in a second operating mode initiated upon rotation of the converter in the first operating mode to a bias release position, propel the media unit by releasing the bias member from the primed position to drive rotation of the converter and the roller as the bias member returns to the resting position.

FIG. 1 depicts an example media processing device 100 constructed in accordance with the teachings of this disclosure. The media processing device 100 includes a housing 104 defined by a plurality of panels. The media processing device 100 stores a supply of discrete media units, such as cards (e.g. identity cards) in an unprocessed media source. In this example, the unprocessed media source is an input hopper (not shown) within the housing 104 and accessible from the exterior of the media processing device 100 via an input hopper door 108. The media processing device 100 also includes an auxiliary input slot 112 for insertion of single media units into the input hopper. The media processing device 100 generates indicia on a media unit from the input hopper before dispensing the media unit into a processed media output. In this example, the processed media output is an output hopper 116 accessible via an output opening 120. As will be discussed below, the indicia applied to the media units by the media processing device 100 is sourced from a cassette (e.g. a ribbon cassette) supported within the housing 104 and accessible from the exterior of the media processing device 100 via a cassette access door 124. In some examples, the access door 124 includes a lock to prevent unauthorized access to the interior of the media processing device 100 and, as described below, rejected media units. Notably, the output opening 120 associated with processed media (i.e., non-rejected cards) is separate from the reject area described in detail below.

Figure 2:
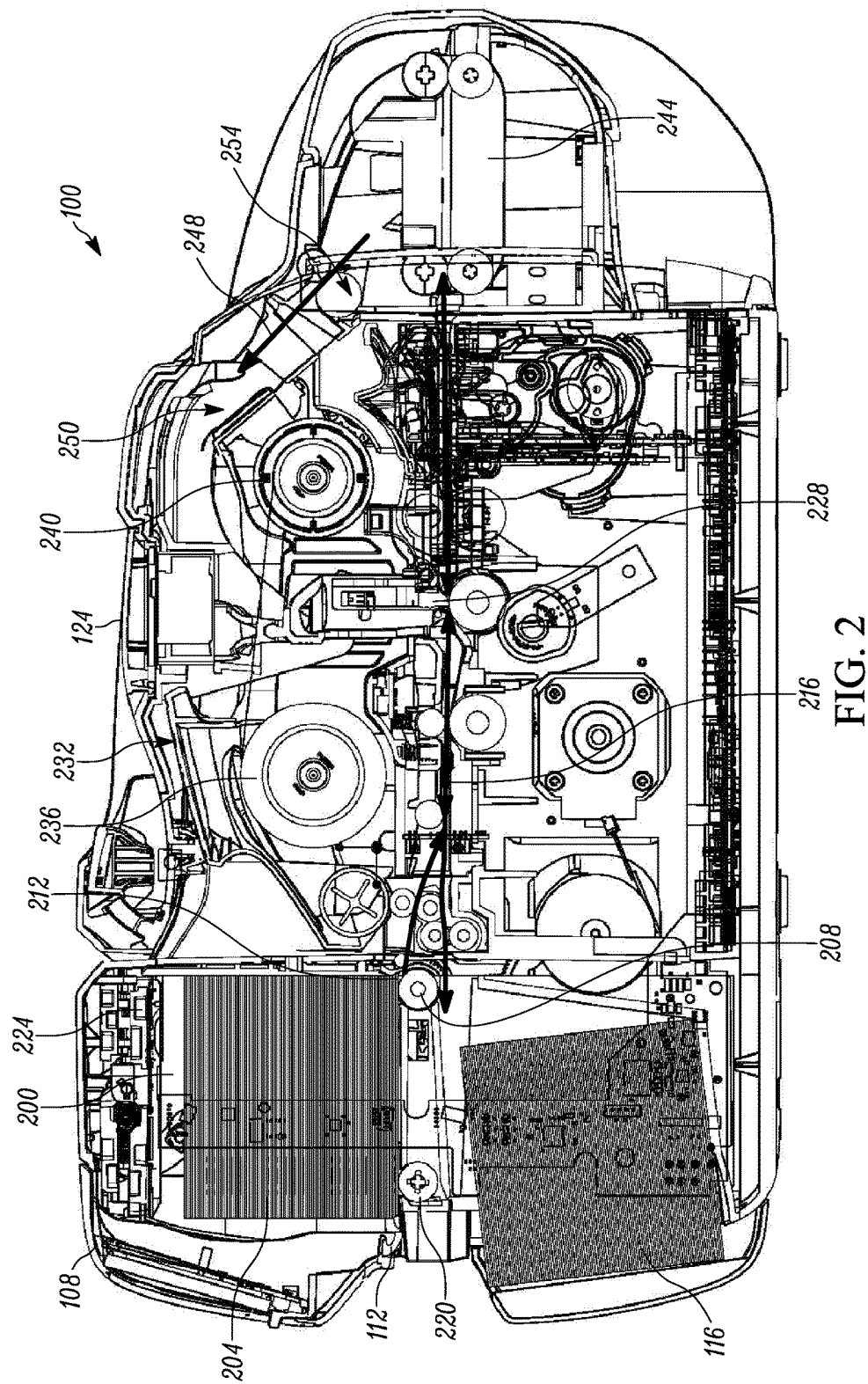
FIG. 2 depicts a cross-sectional view of the media processing device of FIG. 1.

Turning to FIG. 2, a cross-sectional view of the example media processing device 100 of FIG. 1 is depicted. As seen in FIG. 2, the media processing device 100 includes, within the housing 104 an unprocessed media input in the form of an input hopper 200. The input hopper 200 is configured to store a plurality of discrete media units 204, such as identity cards, in a substantially horizontal stack. The input hopper 200 may contain media units 204 of a variety of thicknesses. For example, each media unit 204 has a thickness of between about 0.2 mm and about 1 mm. Typically, the entire supply of media units 204 in the input hopper 200 at a given time have the same thickness. However, in some examples the media processing device 100 is also configured to process a set of media units 204 having a plurality of different thicknesses.

A pick roller 208 is disposed at an outlet 212 of the input hopper 200, and is configured to dispense a single media unit 204 from the input hopper 200 to a media transport assembly configured to guide the media unit 204 along a media processing path 216. The media processing device 100 also includes an input roller 220 at the slot 112, configured to drive a single media unit fed into the slot 112 underneath the stack of media units 204 already present (if any) in the input hopper. The single media unit fed into the slot 112 is then dispensed from the input hopper 200 for travel along the media processing path 216. In other words, the media processing device 100 is configured to process media units retrieved from the stack in the input hopper 200, as well as single-feed media units received via the input slot 112.

The input hopper 200 also contains a biasing assembly 224 disposed above the stack of media units 204. The pick roller 208 dispenses the bottom media unit from the stack of media units 204 by frictionally engaging with the bottom media unit 204. If insufficient force is exerted by the bottom media unit on the pick roller 208, the frictional engagement between the pick roller 208 and the media unit may be too weak for the pick roller 208 to dispense the media unit. When the input hopper 200 is full, the weight of the stack of media units 204 alone may apply sufficient force for engagement between the bottom media unit and the pick roller 208. The biasing assembly 224 is configured to apply a progressively greater force to the top of the stack of media units 204 as the stack shrinks in size, thus maintaining a substantially constant force on the bottom media unit. The biasing assembly 224, in the present example, is implemented as a Sarrus linkage biased towards an open position in which the biasing assembly 224 applies a force on the media units 204 (the linkage is shown in a closed, or retracted, position in FIG. 2) by one or more biasing elements, such as a combination of coil springs.

The media transport assembly includes a plurality of rollers and guide surfaces; the media processing path 216, as seen in FIG. 2, extends from the input hopper 200 to a processing head 228, such as a printhead configured to apply indicia to the media unit 204 by transferring ink to the media unit 204. In this example, the media processing device 100 is a thermal transfer printer, and the printhead 228 is supplied with ink from a cassette 232 removably supported within the housing 104. The housing 104 includes an opening (not shown in FIG. 2) permitting access to the cassette 232. The above-mentioned cassette access door 124 has a closed position (shown in FIG. 2) for obstructing the opening to prevent access to the cassette 232, and an open position for permitting placement and removal of the cassette 232 into and out of the media processing device 100.

During printing operations, an ink ribbon (not shown) travels from a supply roller 236 of the cassette 232 to the printhead 228, and then to a take-up roller 240 of the cassette 232. As the ink ribbon and the media unit 204 pass the printhead 228, the ink ribbon is in contact with the media unit 204. To generate the above-mentioned indicia, certain elements (e.g., printhead dots) of the printhead 228 are selectively energized (e.g., heated) according to machine-readable instructions (e.g., print line data or a bitmap). When energized, the elements of the printhead 228 apply energy (e.g., heat) to the ribbon to transfer ink to specific portions of the media unit 204.

In some examples, processing of the media unit 204 also includes encoding data in an integrated circuit, such as a radio frequency identification (RFID) tag, magnetic strip, or combination thereof, embedded in the media unit 204. Such processing may occur at the printhead 228 mentioned above, or at a distinct secondary processing head upstream or downstream of the printhead 228 along the media processing path 216.

Having traversed the printhead 228, the media unit 204 is transported along the media processing path 216 to the output hopper 116. In the present example, prior to arriving at the output hopper, however, the media unit 204 is transported to a media unit redirector 244 controllable to reverse, or flip, the media unit by receiving the media unit 204, rotating by about 180 degrees, and expelling the media unit 204. Accordingly, the media transport assembly is configured to operate in two opposite directions along at least a portion of the media processing path 216 (illustrated in double lines). Specifically, the media processing path 216 proceeds in a return direction (as opposed to an outbound direction from the input hopper 200 to the printhead 228 and the redirector 244, described above) from the redirector 244 to the printhead 228. As a result of the media unit 204 having been flipped at the redirector 244, on the return pass of the printhead 228 an opposite side of the media unit 204 is exposed to the printhead 228 than on the outbound pass of the printhead 228. The media processing device 100, in other words, is capable of applying indicia to both sides of the media unit 204, before the media unit 204 is transported along the remainder of the media processing path 216 to the output hopper 116.

A media unit 204 travelling along the media processing path 216 may also be redirected from the media processing path 216 to an auxiliary processing path, also referred to as a media reject path. In the illustrated example, the redirector 244 is controllable, for example responsive to a detection of misaligned indicia applied at the printhead 228, a failed data writing operation to an embedded circuit in the media unit 204 or other defect, to rotate to a reject position at an angle other than 180 degrees from the resting position shown in FIG. 2. Having rotated to the reject position, the redirector 244 is configured to expel the media unit 204, which is transported along the reject path 248 to a media unit holder 250 that defines a storage area for rejected media units. As will be discussed below in greater detail, the media processing device 100 includes an auxiliary media unit transporter 254, which in the present example is a component of the media unit holder 250, for receiving a media unit 204 from the redirector 244 and propelling the media unit 204 into the media unit holder 250.

Figure 3:
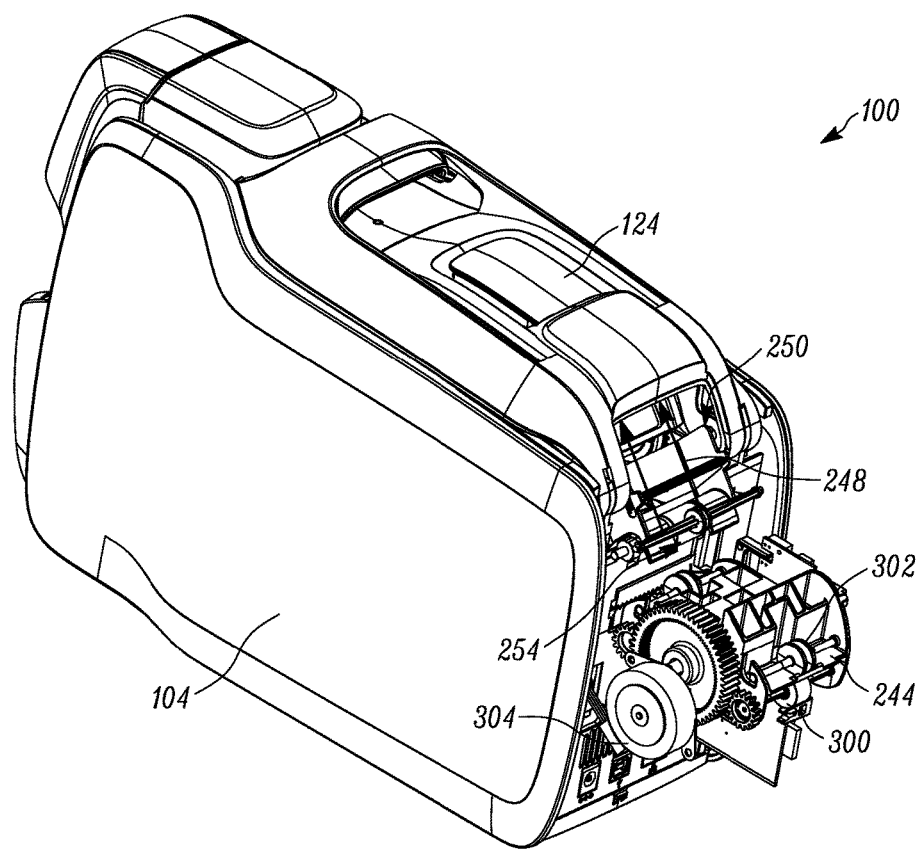
FIG. 3 is a rear perspective view of the media processing device of FIG. 1, with certain portions of the media processing device omitted.

Referring now to FIG. 3, the media processing device 100 is illustrated with a portion of the housing 104 enclosing the redirector 244 omitted to reveal the redirector 244 and a portion of the media unit holder 250, including the auxiliary media unit holder 254. The auxiliary media unit transporter 254 is configured to receive a media unit 204 (not shown in FIG. 3) driven along the reject path 248 by a motorized media unit transporter. In the present example, the motorized media unit transporter is a component of the redirector 244; specifically, the media unit transporter includes a roller 300 driven by a motor 304. Further, the roller 300 forms a nip with a passive roller 302 (in other examples, the passive roller 302 is also driven, by the motor 304 or by another motor). In some examples, the auxiliary media unit transporter 254 need not be a component of the media unit holder 250, and need not receive the media unit 204 from the redirector 244. Thus, the motorized media unit transporter from which the auxiliary media unit transporter 254 receives a media unit 204 can be another driven roller in the media transport assembly mentioned above (i.e. at any suitable point along the media processing path 216).

Having received the media unit 204, the auxiliary media unit transporter 254 is configured, in a first operating mode, to store energy transferred to the auxiliary media unit transporter 254 by the media unit 204 from the above-mentioned media transporter (e.g., the roller 300 of the redirector 244). The auxiliary media unit transporter 254 is further configured, in a second operating mode, to discharge the stored energy to propel the media unit 204 from the auxiliary media unit transporter 254 in the same direction in which the media unit 204 was received. In the present example, the media unit 204 is received and propelled along the reject path 248 in the direction shown in FIG. 3, into the media unit holder 250.

Figure 4:
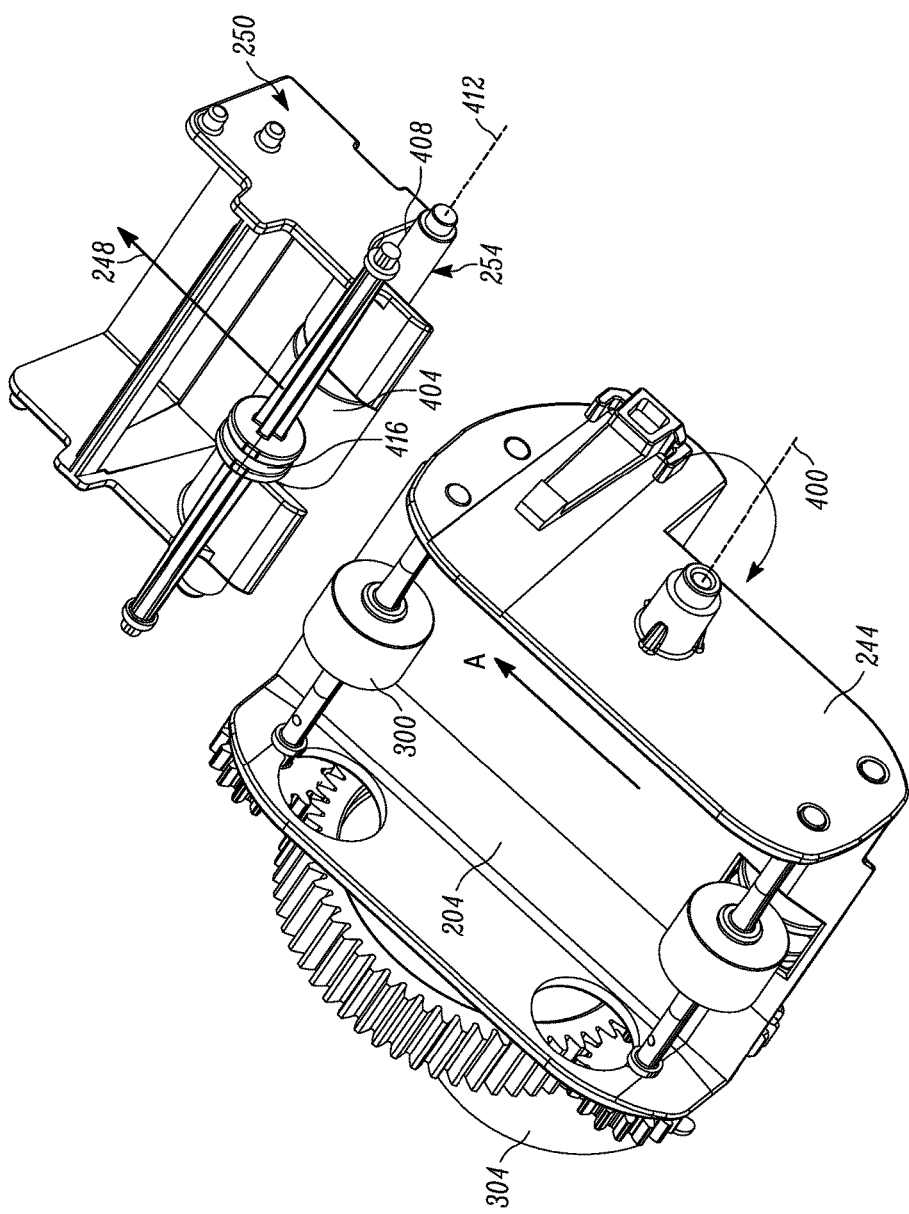
FIG. 4 depicts an auxiliary media unit transporter of the media processing device of FIG. 1.

Referring to FIG. 4, the redirector 244, the media unit holder 250 and the auxiliary media unit transporter 254 are shown in isolation. The redirector 244 is shown having rotated about an axis 400 relative to the housing 104 to travel from the position shown in FIGS. 2 and 3, in which the redirector 244 is configured to receive a media unit 204 from the media processing path 216, to a rejection position. In the rejection position, the redirector 244 is configured to eject the media unit 204 by driving the roller 300 via the motor 304. The ejection of the media unit 204 from the redirector in the direction "A" labelled in FIG. 4 carries the media unit 204 into engagement with a roller 404 of the auxiliary media unit transporter 254. The roller 404 is mounted on a shaft 408 in the illustrated example, which rotates relative to the housing 104 about an axis 412.

In the present example, the auxiliary media unit transporter 254 also includes a secondary passive roller 416 forming a nip with the roller 404. The nip formed by the rollers 404 and 416 imposes sufficient friction between the roller 404 and the media unit 204 that as the media unit 204 comes into engagement with the roller 404, slippage between the media unit 204 and the roller 404 is inhibited or substantially prevented. The nip formed by the rollers 300 and 302 (not visible in FIG. 4) of the redirector 244 also imposes sufficient friction between the roller 300 and the media unit 204 that slippage between the roller 300 and the media unit 204 is inhibited or substantially prevented as the roller 300 drives the media unit 204 into engagement with the roller 404.

Turning to FIGS. 5A-7B, certain additional components of the auxiliary media unit transporter 254 are illustrated, as are the above-mentioned operational modes of the auxiliary media unit transporter 254. As seen in the side view of FIG. 5A, the auxiliary media unit transporter 254 includes a converter 500 connected to the roller 404. In the present embodiment, the converter 500 is rotatable about the same axis 412 as the shaft 408 and the roller 404. Further, the converter 500, in the illustrated example, is fixed to one or both of the roller 404 and the shaft 408. In some examples, the converter 500 is integrally formed with one or both of the roller 404 and the shaft 408. In some examples, the converter 500 is implemented as a distinct component mounted on the shaft 408. In further examples, the converter 500 need not rotate about the axis 412; instead, the converter 500 is mounted to rotate about a distinct axis, and drives the rotation of (or is driven to rotate by) the roller 404 via a drive train assembly (e.g. a gear train) connected the converter 500 with the shaft 408.

The auxiliary media unit transporter 254 also includes a bias member 504 connected between the converter and the housing 104. In the present example, the bias member 504 is a coil spring. However, the bias member 504 may include any one of, or any combination of, a variety of other types of bias member, including a wave spring, a length of elastic polymer, and the like.

Although the housing 104 is not shown in FIGS. 5A-7B, the bias member 504 is connected to a housing anchor 508 that is fixed to an interior of the housing 104. At an end of the bias member 504 opposite the end connected to the housing anchor 508, the bias member 504 is connected to the converter by a converter anchor 512 that is radially displaced (by a distance "d") from the axis 412 about which the shaft 408 and the roller 404 rotate. Accordingly, as will be discussed below, the distance between the anchor 508 (which is fixed to the housing 104) and the anchor 512 (which is fixed to the converter 500 and therefore moves relative to the housing 104 as the converter 500 rotates) changes during the operation of the auxiliary media unit transporter 254. The converter 500, in other words, is configured to convert rotational motion of the roller 404 and the shaft 408 into linear deformation of the bias member 504, as well as to convert the above-mentioned linear deformation into rotational motion of the roller 404.

Figure 5A:
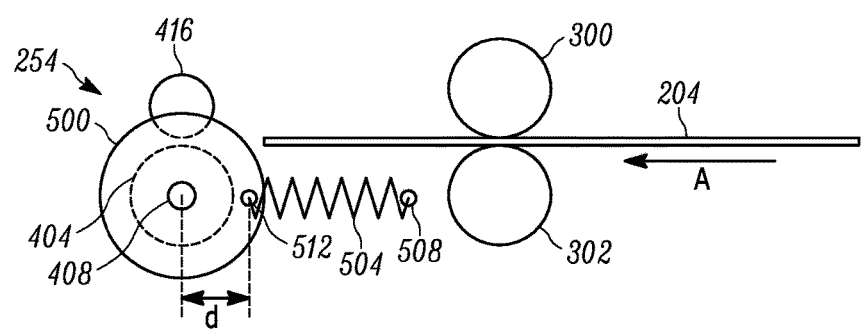
FIGS. 5A, 5B and 6A depict a side view of the auxiliary media unit transporter in a first operating mode.

In FIG. 5A, the media unit 204 is driven in the direction "A" by a media unit transporter such as the rollers 300 and 302 of the redirector 244. However, the media unit 204 has not yet engaged the rollers 404 and 416. The bias member 504 is shown in a resting position, in which the distance between the anchors 508 and 512 is at a minimum, and the energy stored in the bias member 504 is therefore also at a minimum.

Figure 5B:
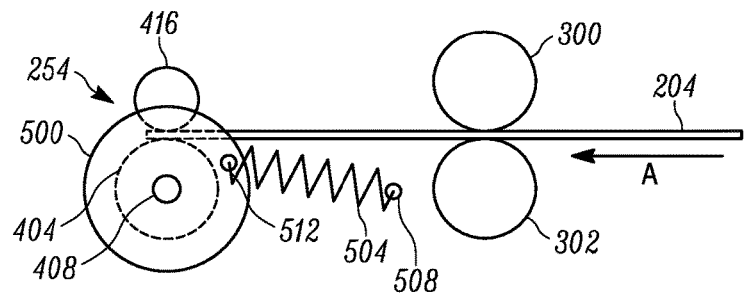

Referring to FIG. 5B, as the media unit 204 continues to be driven in the direction A by the rollers 300 and 302, the auxiliary media unit transporter 254 enters the first operating mode. Specifically, as the media unit 204 is driven into engagement with the rollers 404 and 416, the media unit 204 drives the roller 404 and, as a result, also drives the converter 500. The rotation of the converter 500 in turn begins to deform the bias member 504 from the resting position of FIG. 5A toward a primed position. As seen in FIG. 5B, the bias member 504 has lengthened as the distance between the anchors 508 and 512 increases.

Figure 6A:
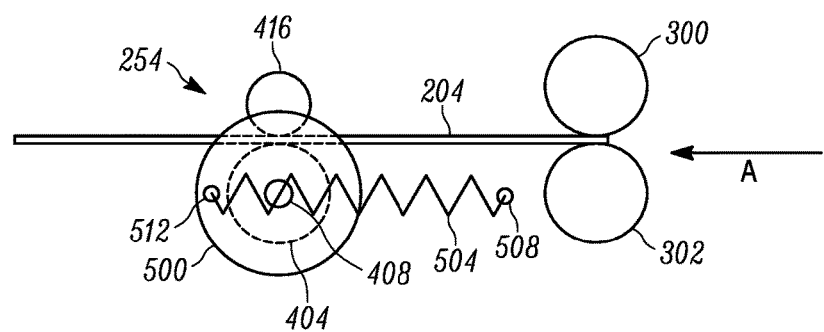

Turning to FIG. 6A, the auxiliary media unit transporter 254 is shown following the continued driving of the media unit 204 by the roller 300. Responsive to the roller 404 being driven by the media unit 204, the bias member 504 has reached a primed position, in which the distance between the anchors 508 and 512 is maximal, and the energy stored in the bias member 504 is therefore also maximal. In the illustrated example, the bias member 504 is under greater tension in the primed position than in the resting position shown in FIG. 5A. However, in other examples the bias member 504 is positioned to be placed under compression in the primed position rather than under tension.

Figure 6B:
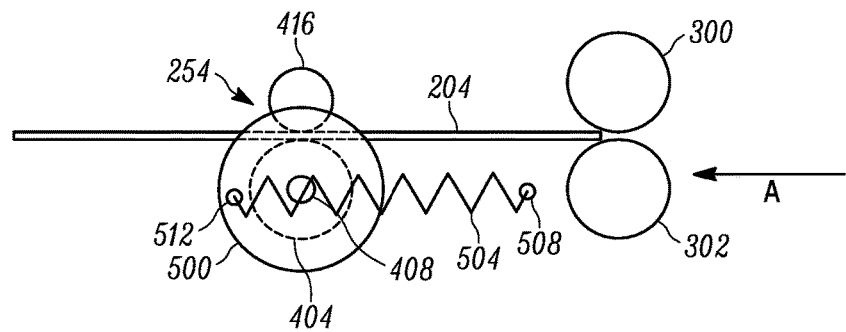
FIGS. 6B, 7A and 7B depict a side view of the auxiliary media unit transporter in a second operating mode.

The auxiliary media unit transporter 254 is positioned relative to the media unit transporter (the rollers 300 and 302, in the present example) such that when the bias member 504 reaches the primed position, the media unit 204 is still driven by the media unit transporter. The bias member 504 has release positions adjacent (e.g., immediately adjacent) to the primed position in either direction of rotation of the converter 500. To continue propelling the media unit 204 in the direction A, the release position counterclockwise (as illustrated) to the primed position of FIG. 6A must be reached by the bias member 504. Therefore, the distance between the nip formed by the rollers 300 and 302 and the nip formed by the rollers 404 and 416 is selected such that the media unit 204 is released by the rollers 300 and 302 only once the bias member 504 has reached the release position, shown in FIG. 6B. As illustrated in FIGS. 6A and 6B, the primed position is reached when the bias member 504 and the anchor 512 are coplanar with the axis 412 about which the converter 500 rotates. The bias position is therefore reached upon continued driving of the media unit 204 by the rollers 300 and 302 when the above-mentioned coplanar orientation has been reached.

Figure 7A:
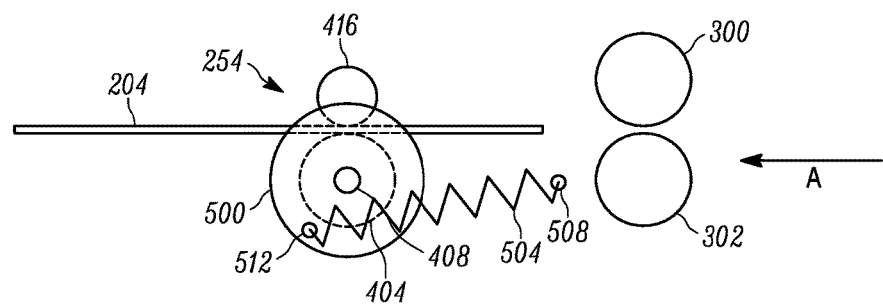

Turning to FIG. 7A, once the release position is reached by the bias member 504, the auxiliary media unit transport 254 initiates the second operating mode. In the second operating mode, the auxiliary media unit transport 254 propels the media unit 204 by releasing the bias member 504 from the primed position to drive rotation of the converter and therefore of the roller 404, as the bias member 504 releases the energy stored therein and returns to the resting position. Accordingly, as shown in FIG. 7A, the bias member 504 retracts toward the resting position and therefore drives rotation of the converter 500 and the roller 404, to propel the media unit 204 in the direction A even after release of the media unit 204 by the rollers 300 and 302.

Figure 7B:
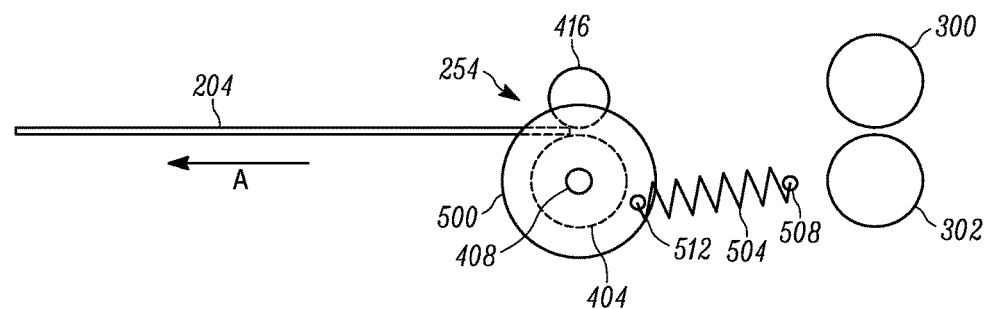

In FIG. 7B, the second operating mode nears completion as the bias member 504 approaches the resting position shown in FIG. 5A. Accordingly, the energy stored in the bias member 504 has been released to drive rotation of the converter 500 and the roller 404 to propel the media unit 204 in the direction A. In particular, the media unit 204 is released by the nip formed by the rollers 404 and 416 prior to the bias member 504 reaching the resting position. When the resting position is reached by the bias member 504, the auxiliary media unit transporter 504 is configured to receive a further media unit from the rollers 300 and 302.

Certain constraints on the arrangement of components of the auxiliary media unit transporter 254 will be apparent from the discussion above. For example, in the illustrated example in which both the roller 404 and the converter 500 are fixed to the shaft 408 and rotate about the axis 412, a portion of the media unit 204 driven into the auxiliary media unit transporter 254 by the rollers 300 and 302 must have sufficient length to drive the roller 404 and the converter 500 through a half-rotation (to transition the bias member 504 from the resting position to the primed position). In other words, the distance between the rollers 300 and 302 and the rollers 404 and 416 is selected to permit a sufficient length of the media unit 204 to be driven into the auxiliary media unit transporter 254. Further, once the media unit 204 is released by the rollers 300 and 302, the remaining length of the media unit 204 to be propelled by the roller 404 must be smaller than one half of the circumference of the roller 404, to permit the entire media unit 204 to be expelled from the auxiliary media unit transporter 254 as the bias member 504 reaches the resting position.

In some examples, the above constraints may be relaxed or avoided, for example by introducing gearing ratios between the converter 500 and the roller 404 (e.g., allowing the roller 404 to be driven through more than one half rotation via the movement of the converter through one half rotation).

Further variations to the structure of the auxiliary media unit transporter 254 as described above are contemplated. In some examples, the auxiliary media unit transporter 254 is disposed within the media processing device 100 to propel media units 204, without the use of an additional motor, into the output hopper 116 rather than, or in addition to, the media unit holder 250. In further examples, the orientation of the bias member 504 is varied, for example depending on spatial considerations within the housing 104. For example, by connecting the roller 404 and the converter 500 via a gear train, the bias member 504 can be relocated to positions other than those discussed above. In still further examples, the secondary roller 416, rather than being a passive roller as described above, is driven by a secondary auxiliary media unit transporter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ...a", "has ...a", "includes ...a", "contains ...a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media processing device having a housing, the media processing device comprising:
   a motorized media unit transporter configured to drive a media unit along a media processing path defined within the housing between an unprocessed media unit source and a processed media unit output;
   an auxiliary media unit transporter including a roller, a converter fixedly connected to the roller, and a bias member connected to the converter;
   the auxiliary media unit transporter configured to:
      (i) in a first operating mode:
         receive the media unit from the motorized media unit transporter into engagement with the roller to drive the roller and the converter concurrently; and
         via rotation of the converter, deform the bias member from a resting position to a primed position; and
      (ii) in a second operating mode:
         initiated upon rotation of the converter in the first operating mode to a bias release position, propel the media unit by releasing the bias member from the primed position to drive rotation of the converter and the roller concurrently as the bias member returns to the resting position.

2. The media processing device of claim 1, wherein the converter is rotatable about an axis, and the converter includes an anchor radially displaced from the axis for connecting the converter with the bias member.

3. The media processing device of claim 2, wherein the converter reaches the bias release position when the bias member is coplanar with the axis and the anchor.

4. The media processing device of claim 2, wherein the roller is rotatable about the axis.

5. The media processing device of claim 1, further comprising an additional roller forming a nip with the roller.

6. The media processing device of claim 5, wherein the additional roller is a passive roller.

7. The media processing device of claim 1, wherein the motorized media unit transporter is configured to:
   drive the media unit along the media processing path when a redirector is in a first position; and
   drive the media unit into the auxiliary media unit transporter when the redirector is in a second position, the redirector being movable between the first and second positions.

8. The media processing device of claim 1, wherein the auxiliary media unit transporter lies on an auxiliary media processing path defined within the housing, the auxiliary media processing path extending from the motorized media unit transporter to a rejected media unit output.

9. The media processing device of claim 1, wherein the bias member is under greater tension in the primed position than in the resting position.

10. The media processing device of claim 1, wherein the bias member is under greater compression in the primed position than in the resting position.

11. The media processing device of claim 1, wherein the bias member includes a coil spring.

12. The media processing device of claim 1, the motorized media unit transporter configured to release the media unit upon rotation of the converter to the bias release position.

13. An auxiliary media unit transporter for a media processing device, comprising:
   a roller;
   a converter fixedly connected to the roller; and
   a bias member connected between the converter and a housing of the media processing device, wherein:
      in a first operating mode, the roller is configured to receive the media unit from a motorized media unit transporter of the media processing device, and to drive the converter to deform the bias member from a resting position to a primed position; and
      in a second operating mode initiated upon rotation of the converter in the first operating mode to a bias release position, the bias member is configured to return from the primed position to the resting position to concurrently drive rotation of the converter and the roller to propel the media unit.

14. The auxiliary media unit transporter of claim 13, wherein the converter is rotatable about an axis, and the converter includes an anchor radially displaced from the axis for connecting the converter with the bias member.

15. The auxiliary media unit transporter of claim 14, wherein the converter reaches the bias release position when the bias member is coplanar with the axis and the anchor.

16. The auxiliary media unit transporter of claim 14, wherein the roller is rotatable about the axis.

17. The auxiliary media unit transporter of claim 13, wherein:

the auxiliary media unit transporter lies on an auxiliary media processing path defined within the housing;

the motorized media unit transporter is configured to drive the media unit along the media processing path when a redirector is in a first position; and the motorized media unit transporter is configured to the media unit along the auxiliary media processing path when the redirector is in a second position, the redirector being movable between the first and second positions.

18. The auxiliary media unit transporter of claim 13, the motorized media unit transporter configured to release the media unit upon rotation of the converter to the bias release position.

* * * * *